United States Patent [19]

Dziama et al.

[11] Patent Number: 5,588,481

[45] Date of Patent: Dec. 31, 1996

[54] SYSTEM FOR PROVIDING HEATING, AIR CONDITIONING AND VENTILATION FOR A VEHICLE

[75] Inventors: Krzysztof E. Dziama, Solihull; John Tipping, Warwick, both of England

[73] Assignee: Rover Group Limited, Birmingham, England

[21] Appl. No.: 503,011

[22] Filed: Jul. 17, 1995

[30] Foreign Application Priority Data

Jul. 30, 1994 [GB] United Kingdom ............... 9415417.6

[51] Int. Cl.⁶ ..................................................... B60H 1/00
[52] U.S. Cl. .......................... 165/42; 62/133; 123/339.14
[58] Field of Search ................ 62/133, 230; 123/339.14, 123/339.15, 339.16, 339.17; 165/14, 42

[56] References Cited

U.S. PATENT DOCUMENTS

| | | | |
|---|---|---|---|
| 3,664,148 | 5/1972 | Yonezu | 62/230 |
| 4,333,606 | 6/1982 | Shimada et al. | 237/123 A |
| 4,381,480 | 4/1983 | Hara et al. | 318/471 |
| 4,391,320 | 7/1983 | Inone et al. | 165/2 |
| 4,408,713 | 10/1983 | Iijima et al. | 236/49 |
| 4,425,766 | 1/1984 | Claypole | 62/133 |
| 4,538,760 | 9/1985 | Kobayashi | 237/2 A |
| 4,602,675 | 7/1986 | Kobayashi | 165/16 |
| 4,698,977 | 10/1987 | Takahashi | 62/133 |
| 4,738,396 | 4/1988 | Doi et al. | 237/2 A |
| 4,791,981 | 12/1988 | Ito | 165/22 |
| 4,858,676 | 8/1989 | Bolfik et al. | 165/2 |
| 4,858,677 | 8/1989 | Doi et al. | 165/12 |
| 4,875,456 | 10/1989 | Tomisawa | 123/339.15 |
| 4,911,257 | 3/1990 | Kajimoto et al. | 180/65.3 |
| 4,978,061 | 12/1990 | Ogihara et al. | 236/49.3 |
| 5,008,803 | 4/1991 | Iida | 364/148 |
| 5,055,825 | 10/1991 | Yang | 340/439 |
| 5,074,463 | 12/1991 | Suzuki et al. | 236/49.3 |
| 5,305,613 | 4/1994 | Hotta et al. | 62/209 |
| 5,309,731 | 5/1994 | Nonoyama et al. | 62/244 |

FOREIGN PATENT DOCUMENTS

| | | | |
|---|---|---|---|
| 1450740 | 9/1976 | United Kingdom . | |
| 1603722 | 11/1981 | United Kingdom . | |
| 2085196 | 4/1982 | United Kingdom . | |
| 2229328 | 9/1990 | United Kingdom . | |

Primary Examiner—William E. Tapolcai
Attorney, Agent, or Firm—Davis and Bujold

[57] ABSTRACT

A system for providing a supply of air to the passenger compartment of a vehicle, the system comprising ducting for supplying air to a vehicle passenger compartment, a blower for propelling air through the ducting, a heat supply for supplying heat to the air, an evaporator for cooling the air, a vehicle speed detector, and a control unit for controlling the speed of the blower, and an engine sensor which produces a signal indicative of whether the vehicle engine is running, wherein the control unit is arranged to limit the blower speed to a predetermined level if the blower has been operating for a predetermined period while the vehicle speed is below a predetermined level, and to control the system in various other ways.

6 Claims, 2 Drawing Sheets

5,588,481

SYSTEM FOR PROVIDING HEATING, AIR CONDITIONING AND VENTILATION FOR A VEHICLE

BACKGROUND OF THE INVENTION

The present invention relates to a system for providing a supply of air for the passenger compartment of a vehicle which may be heated or cooled, and for providing other heating functions such as windscreen heating. The invention provides improved controls for such a system to improve its functioning and at the same time conserve the power used.

SUMMARY OF THE INVENTION

According to a first aspect of the invention there is provided a system for providing a supply of air to the passenger compartment of a vehicle, the system comprising ducting for supplying air to a vehicle passenger compartment, a blower for propelling air through the ducting, a heat supply for supplying heat to the air, an air cooler for cooling the air, a vehicle speed detector, and a control unit for controlling the speed of the blower, wherein the control unit is arranged to limit the blower to a predetermined blower speed if the blower has been operating for a predetermined period while the vehicle speed is below a predetermined vehicle speed.

This arrangement helps to prevent the possibility of the vehicle battery being drained of power, which can otherwise happen in some instances if the engine is only idling so the alternator can only supply a relatively small amount of power, and a heavy load is needed.

Preferably the system further comprises an engine sensor which produces a signal indicative of whether the vehicle engine is running, and the control unit is arranged to limit the blower to said predetermined blower speed if the engine is running and the vehicle speed is below said predetermined vehicle speed for said predetermined period.

Preferably the control unit is arranged to limit the blower speed to a second, lower, predetermined blower speed if the blower has been operating for a further predetermined period while the vehicle speed is below a predetermined vehicle speed. This predetermined vehicle speed may be same as, or different to, the first mentioned predetermined vehicle speed.

Preferably the control unit is arranged to allow the blower speed to increase above said predetermined blower speed if the vehicle speed increases above a second predetermined level. This second level may be the same as the first mentioned predetermined level, or may be higher.

Preferably the control unit is arranged to allow the blower speed to increase above said predetermined blower speed only if the vehicle speed remains above the second predetermined vehicle speed for a predetermined time.

The present invention also provides a system for providing a supply of air to the passenger compartment of a vehicle, the vehicle having a battery which is used to power the system, the system comprising ducting for supplying air to a vehicle passenger compartment, a blower for propelling air through the ducting, a heat supply for supplying heat to the air, a cooler for cooling the air, and a control unit for controlling the speed of the blower and at least one other load, wherein the control unit is arranged to monitor the voltage of the battery and, if the voltage falls below a predetermined level, shut down the loads which it controls.

The control unit may be further arranged to shut down part of its own functionality if the voltage falls below said predetermined level.

Preferably the control unit is arranged to monitor the battery voltage after it has fallen below said predetermined level, and to return power to at least some of the loads it controls when the voltage rises above a further predetermined level, which may be higher than said predetermined level.

There is a further problem with known systems in that, when the system is set to direct air at the windscreen, if the air is being recirculated through the system, then moisture in the air can cause the windscreen to mist up.

Accordingly the present invention provides a system for providing a supply of air to a passenger compartment of a vehicle, the system comprising a first air intake for taking in air from outside the vehicle, a second air intake for taking in air from the passenger compartment, ducting for supplying the air to a plurality of positions in the vehicle passenger compartment one of which is near a windscreen of the vehicle, a blower for propelling air through the ducting, intake valve means for selecting which intake is used, outlet valve means for controlling to which position the air is supplied, and control means for controlling the intake valve means such that, when the outlet valve means is directing more than a predetermined proportion of the air towards the vehicle windscreen, the first intake is used.

There is a further problem with known systems in that, if ambient temperature around the vehicle is particularly warm and the system is set to take in air from outside the vehicle, it will be very difficult or impossible for the system to keep the passenger compartment cool. This can result in passenger discomfort or excessive drainage of power from the vehicle battery.

Accordingly the present invention provides a system for providing a supply of air to a passenger compartment of a vehicle, the system comprising a first air intake for taking in air from outside the vehicle, a second air intake for taking in air from the passenger compartment, ducting for supplying the air to the vehicle passenger compartment, a blower for propelling air through the ducting, intake valve means for selecting which intake is used, a temperature sensor for sensing the ambient temperature outside the vehicle, and control means for controlling the intake valve means such that, when the ambient temperature is above a predetermined level, the second intake is used.

Said predetermined level may be fixed or may vary depending on the inputs to the control means. For example it may decrease as the manually operated controls are set to demand a lower temperature inside the passenger. compartment.

Another problem with known systems is that, when the blower is switched on, the air in the ducting may be at a very high or low temperature such that its expulsion into the passenger compartment will cause discomfort to the passengers. Also if the ambient temperature is very high and the blower is switched on with the driver controls in a position demanding cooled air, there may be some delay before the evaporator is functioning fully to give the required cooling.

Accordingly the present invention provides a system for providing a supply of air to a passenger compartment of a vehicle, the system comprising air intake for taking in air from outside the vehicle, ducting for supplying the air to the vehicle passenger compartment, a blower for propelling air through the ducting, and control means for controlling the speed of the blower such that, when the blower is switched on, the control unit increases the speed of the blower gradually to the required level. The increase may take place over a period of from 5 to 20 seconds.

It is also known to provide systems with a controlled demist or defrost setting which can be selected by the driver when the vehicle is started form cold and which will turn on the blowers at a high speed, direct air at the screen and provide a high degree of heating in an attempt to demist or defrost the windscreen as quickly as possible. However it has been found that this is ineffective initially because the engine takes a significant time to warm up and the air directed onto the screen at the start of the process can still be cold.

Accordingly the present invention provides a system for providing a supply of air to a passenger compartment of a vehicle having an engine, the system comprising an air intake for taking in air, ducting for supplying the air to the vehicle passenger compartment, a blower for propelling air through the ducting, heating means for heating the air using heat from the vehicle engine, a temperature sensor for sensing the temperature of the engine, and control means arranged to increase the speed of the blower in response to an increase in the temperature of the engine.

The controlled speed increase may occur only within a predetermined range of temperatures of the engine.

The controlled speed increase may occur only during a specific sequence of operations programmed into the control unit which can be selected to clear the vehicle windscreen.

DETAILED DESCRIPTION OF THE PREFERRED EMBODIMENTS

Figure 1:
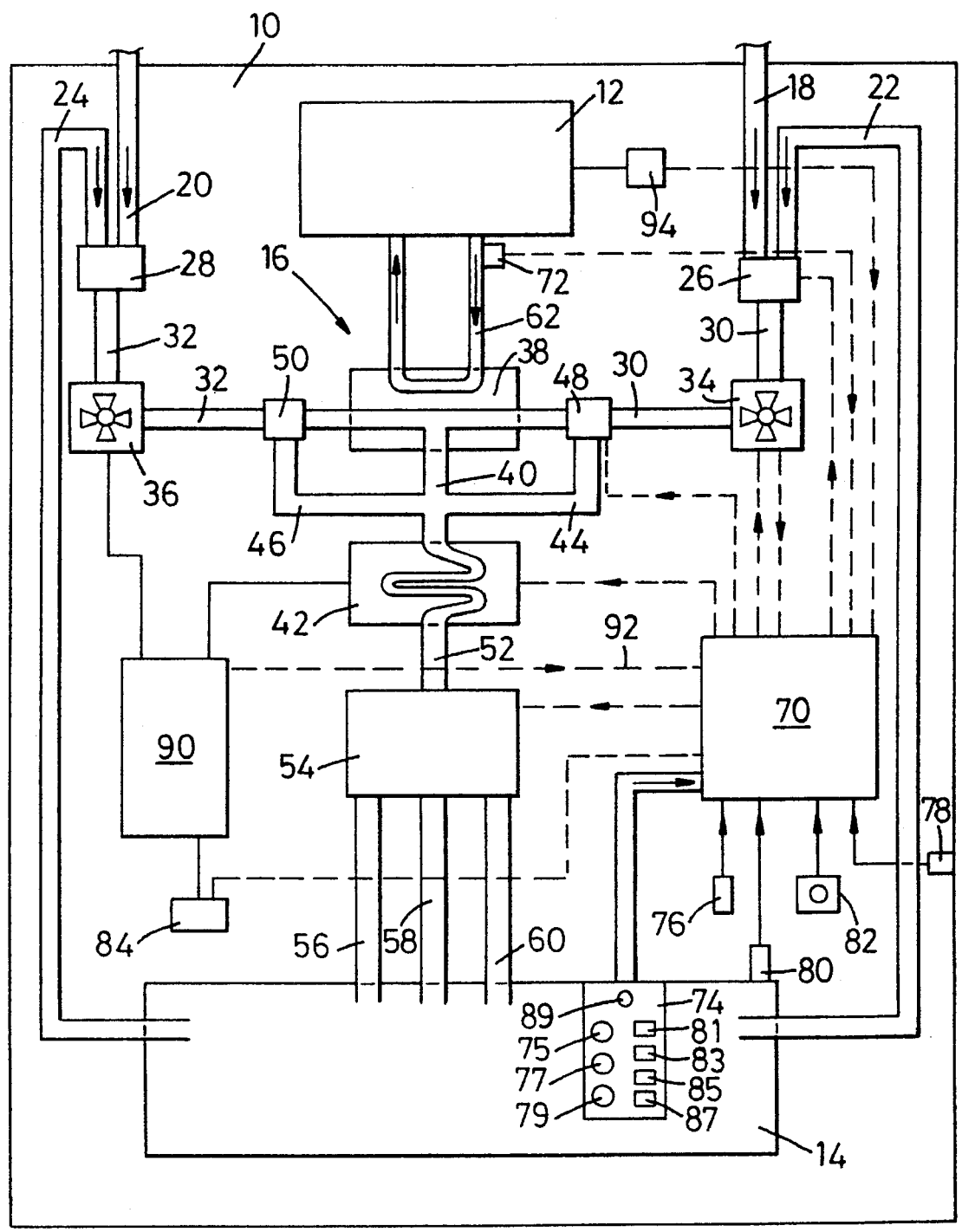
FIG. 1 is a diagrammatic representation of an air conditioning system for a vehicle according to the present invention.

Referring to FIG. 1, according to a preferred embodiment of the invention, a vehicle 10 has an engine 12 and a passenger compartment 14 and an air conditioning system 16 for supplying heated or cooled air or ventilation to the passenger compartment. The air conditioning system comprises a right fresh air inlet duct 18, for taking in air from outside the vehicle, and a right recirculation inlet duct 22 for taking in air from the passenger compartment. These lead to a right inlet valve 26 which is operable to select whether the fresh air or recirculation inlet is used. Ducting 30 from the inlet valve 26 leads via a right blower 34 to a heat exchanger 38. Left inlet ducts 20 and 24, a left inlet valve 28, ducting 32 and a left blower 36 are arranged in corresponding manner on the opposite side of the vehicle 10. A heat exchanger outlet duct 40 leads from the heat exchanger 38 to an air cooler in the form of an evaporator 42. A right bypass duct 44 leads from the ducting 30 between the right blower 34 and the heat exchanger 38 to the heat exchanger outlet duct 40. A right bypass valve 48 controls the flow of air from the right blower to either pass through or bypass the heat exchanger. A left bypass duct 46 and bypass valve 50 are arranged in corresponding manner on the left side of the vehicle. An evaporator outlet duct 52 leads from the evaporator to an outlet valve system 54 which controls the proportion of air flowing to each of three outlet ducts 56, 58, 60 which supply the air to the passenger compartment in directions towards the windscreen, passengers' feet, and passengers' face respectively.

Engine cooling air is circulated from the engine 12 to the heat exchanger 38 and back to the engine in piping 62. This provides the heat input to the heat exchanger.

A control unit 70 controls the operation of the inlet valves 26, 28, the blowers 34, 36, the bypass valves 48, 50, the evaporator 42 and the outlet valve system 54. The control lines are only shown for the right side of the vehicle for the sake of clarity. A heater core sensor 72 mounted on the piping 62 sends a signal to the control unit 70 indicative of the temperature of the engine 12. The control unit also receives inputs from a control panel 74 in the passenger compartment, a vehicle speed sensor 76 which comprises part of an A.B.S. system, an external temperature sensor 78 which senses the temperature outside the vehicle, an internal temperature sensor 80 which senses the temperature inside the passenger compartment, and a solar radiation sensor 82 which senses the direction and intensity of solar radiation which causes heating of the passenger compartment.

The vehicle also has a heater 84 for the front screen which is turned on or off from the control panel 74 via the control unit. The control unit can therefore monitor whether the front screen heater 84 is on or off.

The vehicle has a battery 90 which provides power for the system if there is insufficient power produced by the alternator 94. The control unit 70 monitors the voltage of the battery via line 92.

The control unit 70 also monitors whether or not the engine 12 is running by monitoring the output from the alternator 94. In this sense the alternator acts as an engine sensor because it only produces a current when the engine is running.

The control panel has a manual control for the blower speed 75, a control 77 for the distribution of air between the outlet ducts 56, 58, 60, and a temperature control 79. It also has an air conditioning switch 81 which turns the evaporator on and off. There is an automatic setting switch 83 which allows the temperature to be set and leaves the control of the unit 70 to set the blower speeds and the air distribution to achieve that temperature taking into account the temperature inside and outside the vehicle, the direction and intensity of the solar radiation and the vehicle speed. There is a switch 85 for selecting whether fresh air or recirculated air is taken into the system, and a switch 87 for selecting an automatic demist/defrost function.

Under normal operation the driver or passenger can select the blower speed, the temperature of the air and the proportion of air supplied to each of the outlets 56, 58, 60. If the air conditioning is turned on then temperatures below the external ambient temperature can be provided. If the air conditioning is not turned on and temperatures below the external ambient temperature are selected, a warning light 89 is lit.

Because all the controls are carried out via the control unit 70, the control unit can override the manual controls in certain circumstances, and determine the details of the operation of the system.

One of the requirements of the system is that it be arranged to conserve battery power if there is a possibility of the battery 90 being drained so that the voltage it can supply drops. One of the times when this is likely to occur is if the engine speed is low, for example because the engine is only idling, and the load on the battery is high because the blowers are set to a high speed. The control unit is therefore arranged to detect engine idle by detecting that the engine is running and that the vehicle speed is below 5 mph, and if the engine is idling for more than 20 minutes with the blower speed set above a predetermined speed, the control unit will reduce the blower speed to that predetermined speed. The reduction in speed of the blowers may be stepped with further set time periods between the steps. If the vehicle speed increases above 5 mph the control unit returns the blower speed to the original level. A predetermined period of increased vehicle speed, for example between 30 and 60 seconds, can be required before the blowers are returned to their original speed.

The control unit 70 is also arranged to monitor the battery voltage continuously. The standard voltage is 12 V. If the voltage drops below a first predetermined level, in this example 11.25 V, and the heated front screen is on, the control unit turns off the power to the front screen heater 84. This is because this is the highest individual load on the battery. If the voltage increases to a second, higher predetermined level, in this case 11.75 V and remains above that level for a predetermined period, e.g. between 30 and 60 seconds, the control unit returns power to the heater 84. If the voltage drops below a third predetermined level, lower than the first, in this example 10 V, the control unit shuts off the power to all of the remaining loads it controls, i.e. in this case the blowers, 48, 50, and the evaporator 42. It also shuts down part of its own functionality, i.e. circuits within the control unit which monitor signal inputs and control various functions of the system. The control unit 70 then runs at a lower level performing less functions than it would normally do. The main function which it does still perform, and preferably the only one, is to monitor the battery voltage. When the voltage increases to a fourth predetermined value, between the first and third predetermined values, and in this example 10.5 V, the system resumes its normal functionality.

As mentioned above, in order to reduce the formation of condensation on the windscreen the control unit 70 monitors the position of the outlet valve system 54 and the inlet valves 26, 28. If more than a predetermined proportion of the air is being directed at the windscreen and the inlet valves are causing the air in the system to recirculate, then the control unit switches the intake valves 26, 28 so that fresh air is taken into the system instead. The critical proportion of air will depend on what proportions are possible in the system. If the supply to each of the outlets 56, 58, 60 can only essentially be turned on or off, the critical proportion could be approximately zero, i.e. if any air is being directed towards the screen, the system will take in fresh air. If the supply to the outlets can be more accurately controlled, then the critical proportion could be such as would suggest that clearing the windscreen was required, for example 20% or 30%.

The control unit 70 also monitors the external ambient temperature using the external temperature sensor 78. If the external temperature is above a predetermined level, in this example 37° C., the control unit operates the intake valves 26, 28 so that air is recirculated through the system. This is so that the evaporator 42 is only trying to cool the air in the system to the desired temperature, and not a continuous supply of hot air from outside the vehicle. This assumes that, for air temperatures above 37° C., the driver will be asking the system to cool the air. It is also possible to have the automatic switch to recirculation only of the controls on the control panel 74 are set such that cooling of the air is required. Alternatively the critical external temperature, instead of being a set value, could vary with the temperature required by the setting of the controls on the control panel, for example being a fixed amount higher.

The control unit also controls the power to the blowers 34, 36 when they are turned on from the control panel 74. The voltage applied to the blowers is ramped up at a steady rate from zero to the required level over a predetermined period of, for example, 15 seconds. This has two advantages. Firstly, the air which was in the system may be at an undesirably low or high temperature, and this feature reduces the discomfort that can be caused to the passengers if that air is blown at them suddenly. Also, the evaporator does not become fully operational immediately and this feature enables it to reach its full operating condition before the demand on it is too great.

Figure 2:
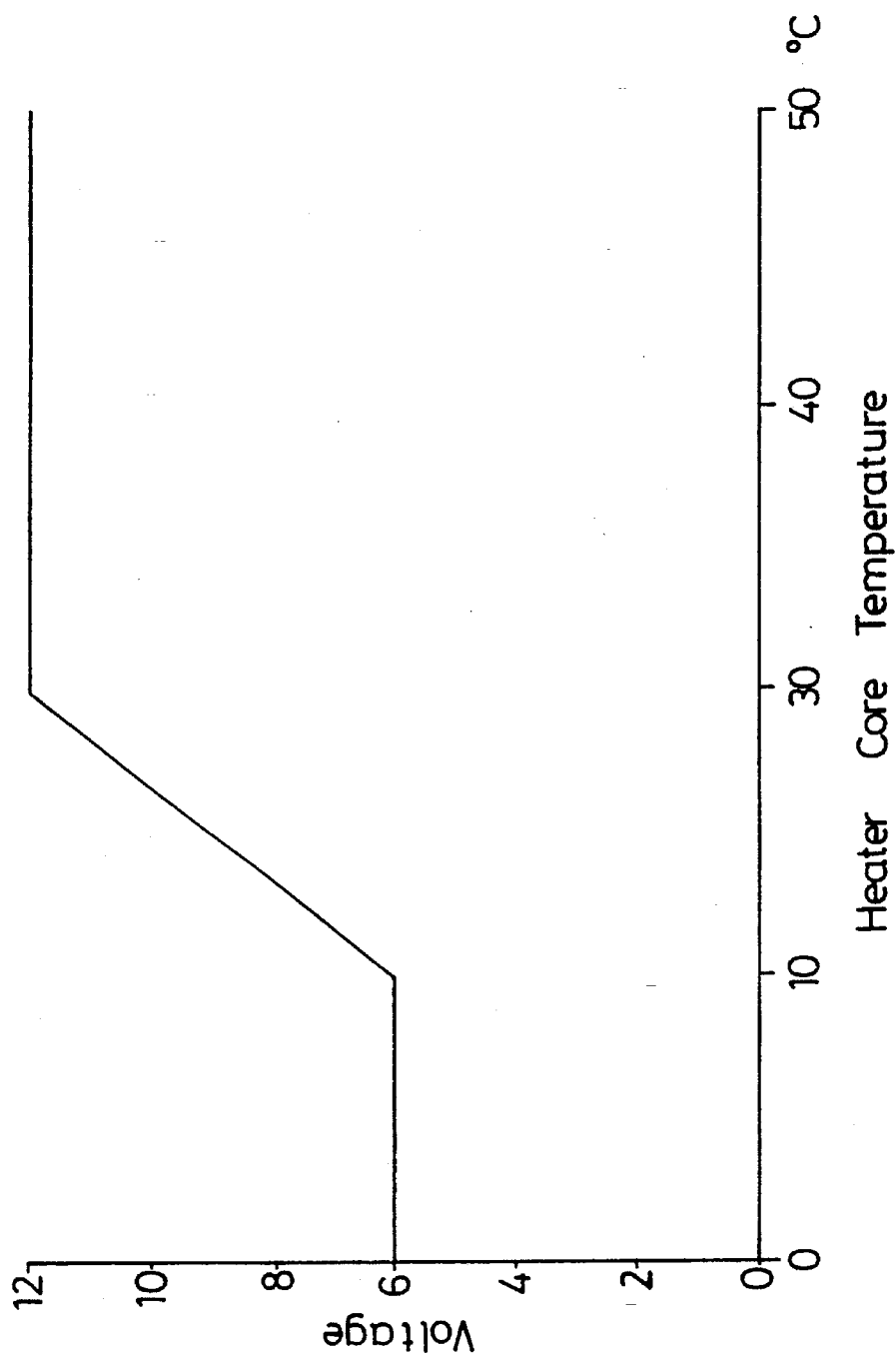
FIG. 2 is a graph illustrating part of the operation of the system of FIG. 1.

When the automatic demist/defrost setting is selected the outlet valve system 54 is set to direct air at the windscreen through the first outlet duct 56 and the bypass valves 48, 50 direct all the air through the heat exchanger 38. The blower speed is controlled as shown in FIG. 2, and varies with the temperature of the engine as indicated by the heater core sensor 72. When the engine temperature is below a first temperature, in this case 10° C., the voltage supplied to the blowers is 6 V. Then between the first temperature and a second, higher temperature, in this case 30° C., the voltage increases to 12 V. Above the second temperature the voltage remains at 12 V. This arrangement has been found to produce effective defrosting of the screen, because it avoids directing large quantities of cold air at the screen before the heat supplied to the heat exchanger from the engine is sufficient to warm it.

What is claimed is:

1. A system for providing a supply of air to the passenger compartment of a vehicle, the system comprising ducting for supplying air to a vehicle passenger compartment, a blower for propelling air through the ducting, a heat supply for supplying heat to the air, an air cooler for cooling the air, a vehicle speed detector, and a control unit for controlling the speed of the blower, wherein the control unit is arranged to limit the blower to a predetermined blower speed if the blower has been operating for a predetermined period while the vehicle speed is below a predetermined vehicle speed.

2. A system according to claim 1 further comprising an engine sensor which produces a signal indicative of whether the vehicle engine is running, wherein the control unit is arranged to limit the blower to said predetermined blower speed if the engine is running and the vehicle speed is below said predetermined vehicle speed for said predetermined period.

3. A system according to claim 1 wherein the control unit is arranged to limit the blower speed to a second, lower, predetermined blower speed if the blower has been operating for a further predetermined period while the vehicle speed is below a predetermined vehicle speed.

4. A system according to claim 1 wherein the control unit is arranged to allow the blower speed to increase above said predetermined level if the vehicle speed increases above a predetermined level.

5. A system according to claim 4 wherein the control unit is arranged to allow the blower speed to increase above said predetermined level only if the vehicle speed remains above said predetermined level for a predetermined time.

6. A system according to claim 2 wherein the engine sensor comprises an alternator.

* * * * *